US011998101B1

(12) United States Patent
Wise

(10) Patent No.: US 11,998,101 B1
(45) Date of Patent: Jun. 4, 2024

(54) SOLUTION REFILL CARTRIDGE DEVICE

(71) Applicant: Robert Wise, Penngrove, CA (US)

(72) Inventor: Robert Wise, Penngrove, CA (US)

( * ) Notice: Subject to any disclaimer, the term of this patent is extended or adjusted under 35 U.S.C. 154(b) by 0 days.

(21) Appl. No.: 17/506,942

(22) Filed: Oct. 21, 2021

Related U.S. Application Data

(63) Continuation of application No. 17/018,826, filed on Sep. 11, 2020, which is a continuation of application No. 16/875,100, filed on May 15, 2020, now abandoned, which is a continuation-in-part of application No. 16/856,362, filed on Apr. 23, 2020, now Pat. No. 11,304,495, which is a continuation-in-part of application No. 16/855,361, (Continued)

(51) Int. Cl.

| | |
|---|---|
| ***A45D 34/04*** | (2006.01) |
| ***A45D 40/04*** | (2006.01) |
| ***B29C 33/38*** | (2006.01) |
| ***B29C 39/00*** | (2006.01) |
| ***B29C 39/38*** | (2006.01) |
| ***B29C 45/00*** | (2006.01) |
| ***B29C 45/72*** | (2006.01) |
| ***B29C 49/00*** | (2006.01) |
| ***B29C 49/64*** | (2006.01) |
| *A45D 34/00* | (2006.01) |
| *A45D 40/00* | (2006.01) |
| *B29K 29/00* | (2006.01) |

(52) U.S. Cl.
CPC ........... *A45D 34/041* (2013.01); *A45D 40/04* (2013.01); *B29C 33/3842* (2013.01); *B29C 39/003* (2013.01); *B29C 39/38* (2013.01); *B29C 45/0001* (2013.01); *B29C 45/0013* (2013.01); *B29C 45/72* (2013.01); *B29C 49/0005* (2013.01); *B29C 49/64* (2013.01); *A45D 2034/005* (2013.01); *A45D 2040/0043* (2013.01); *A45D 2040/005* (2013.01); *B29K 2029/04* (2013.01)

(58) Field of Classification Search
CPC .................. A45D 34/041; A45D 40/04; A45D 2034/005; A45D 2040/005; A45D 2040/0043; A61M 35/003
See application file for complete search history.

(56) References Cited

U.S. PATENT DOCUMENTS

| | | | |
|---|---|---|---|
| 1,863,106 | A | 6/1932 | Alexandre |
| 1,904,364 | A | 4/1933 | Fullmer |

(Continued)

*Primary Examiner* — Jennifer C Chiang
(74) *Attorney, Agent, or Firm* — Boudwin Intellectual Property Law, LLC; Daniel Boudwin

(57) ABSTRACT

A solution refill cartridge device configured to be joined to a dispenser includes a housing having a formed side with perimeter sidewalls creating an open end that provides access to an interior volume that receives a solution. The solution conforms to the interior volume and a dispenser, whereby the solution cartridge refill device's open side is configured with an enclosure apparatus that seals the solution within the solution cartridge refill device. The enclosure apparatus is removable so to access the solution within the solution refill cartridge device. Removal of the enclosure apparatus allows the formed solution to be dispensed through the open side of the solution refill cartridge device. The solution refill cartridge device aligns and mates to a dispenser to allow the formed solution to be dispensed with, on or in the dispenser.

23 Claims, 18 Drawing Sheets

11
15
15
13
21
21
22

Related U.S. Application Data filed on Apr. 22, 2020, now Pat. No. 11,317,698, which is a continuation-in-part of application No. 16/683,689, filed on Nov. 14, 2019, now Pat. No. 11,304,494, said application No. 16/856,362 is a continuation-in-part of application No. 16/683,689, filed on Nov. 14, 2019, now Pat. No. 11,304,494.

(56) References Cited

U.S. PATENT DOCUMENTS

| | | | | |
|---|---|---|---|---|
| 4,343,460 | A | 8/1982 | Gende | |
| 4,702,398 | A | 10/1987 | Seager | |
| 5,833,382 | A | 11/1998 | Jenks et al. | |
| 5,947,621 | A | 9/1999 | Szekely | |
| 7,708,169 | B1 | 5/2010 | Szoke, Jr. | |
| 8,919,617 | B2 | 12/2014 | Foley | |
| 9,872,551 | B2 | 1/2018 | Swaile et al. | |
| 10,278,473 | B2 * | 5/2019 | Groffsky | A45D 33/04 |
| 10,743,636 | B2 * | 8/2020 | Bushell | A45D 40/04 |
| 11,033,091 | B2 * | 6/2021 | Wiesenthal | A45D 40/16 |
| 11,490,708 | B2 * | 11/2022 | Groffsky | B65D 83/0038 |
| 11,517,098 | B2 * | 12/2022 | Nolan | A45D 40/14 |
| 2004/0120756 | A1 | 6/2004 | Cheng | |
| 2018/0249808 | A1 | 9/2018 | Crawford et al. | |
| 2018/0249809 | A1 | 9/2018 | Crawford et al. | |
| 2021/0289918 | A1 * | 9/2021 | Thulin | A45D 40/16 |
| 2022/0395077 | A1 * | 12/2022 | Chen | A45D 40/16 |
| 2023/0320473 | A1 * | 10/2023 | Schwarz Borgo | A45D 34/041 401/213 |

* cited by examiner

100

SOLUTION REFILL CARTRIDGE DEVICE

CROSS REFERENCE TO RELATED APPLICATIONS

This application claims the benefit of U.S. patent application Ser. No. 17/018,826, filed on Sep. 11, 2020, which is a continuation-in-part of U.S. patent application Ser. No. 16/875,100, filed on May 15, 2020, which is a continuation-in-part of U.S. patent application Ser. No. 16/856,362, filed on Apr. 23, 2020, which is a continuation-in-part of U.S. patent application Ser. No. 16/855,361 filed on Apr. 22, 2020, which is a continuation-in-part of U.S. patent application Ser. No. 16/683,689 filed on Nov. 14, 2019. The above identified patent applications are herein incorporated by reference in their entirety to provide continuity of disclosure.

BACKGROUND OF THE INVENTION

The present invention relates to a dispenser housing. More particularly, the present invention provides a housing that has is adapted to accept refill cartridges.

A large number of humans use deodorant, or similar spreadable substances every day. These substances often come in plastic canisters. These canisters are meant to be used once then tossed aside. While these canisters are functional and inexpensive, they also create waste.

Plastic takes decades to decompose and all the while takes space in landfills. The trash issue in our planet is starting to reach critical levels as more and more things are made to be disposable. Items such as canisters take up even more room due to the nature of having the canister having an interior volume to hold a solution which is dispensed through the usage of the consumable product. Due to the number of canisters used these items account for a significant amount of landfill.

Consequently, there is a need in for an improvement in the art of dispenser housings in order to provide for waste reduction. The present invention substantially diverges in design elements from the known art while at the same time solves a problem many people face when using dispensers to apply substances to a desired surface, such as an individual's body. In this regard the present invention substantially fulfills these needs.

SUMMARY OF THE INVENTION

The present invention provides a solution refill cartridge device wherein the same can be utilized for providing convenience for the user when using refilling various types of dispensers with new substance cartridges or refilled substance cartridges to apply substances to a desired surface. The solution refill cartridge device is configured to be joined to a dispenser and includes a housing having a formed side with perimeter sidewalls creating an open end that provides access to an interior volume that receives a solution. The solution conforms to the interior volume and a dispenser. The solution cartridge refill device's open side is configured with an enclosure apparatus that seals the solution within the solution cartridge refill device. The enclosure apparatus is removable so to access the solution within the solution refill cartridge device. Removal of the enclosure apparatus allows the formed solution to be dispensed through the open side of the solution refill cartridge device. The solution refill cartridge device aligns and mates to allow the formed solution to be dispensed with, on or in the dispenser.

Another object of the present invention is to provide a solution refill cartridge device that includes a material selected from at least the list of plastic, metals, organic materials, PVOH, Poly Vinyl Succinate, Butene Diol Vinyl Alcohol Co-Polymer, cellulose pulp, or any combination thereof.

A further object of the present invention is to provide a solution refill cartridge device that is configured to align with the open end of varied materials, shapes and sized dispensers.

Still another object of the present invention is to provide a solution refill cartridge device that includes a coupling device embedded within the solution of the open side of the solution cartridge, which mates to a coupler of a dispenser so to affix a solution from within the solution refill cartridge device to a dispenser.

An additional object of the present invention is to provide a solution refill cartridge device whereby the coupling apparatus is a temporary attachment configured to last the duration of the solution, wherein the coupling is accomplished via at least one of clip on, rotatable coupled on, snap on or other similar means of coupling the cartridge to a dispenser.

Another object of the present invention is to provide a solution refill cartridge device that includes a protective outer encasement, made of one or more materials selected from at least the list of plastic, metals, organic materials, PVOH, Poly Vinyl Succinate, Butene Diol Vinyl Alcohol Co-Polymer, cellulose pulp, cellophane, nitrous cellophane, cellulose, or a mixture thereof.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
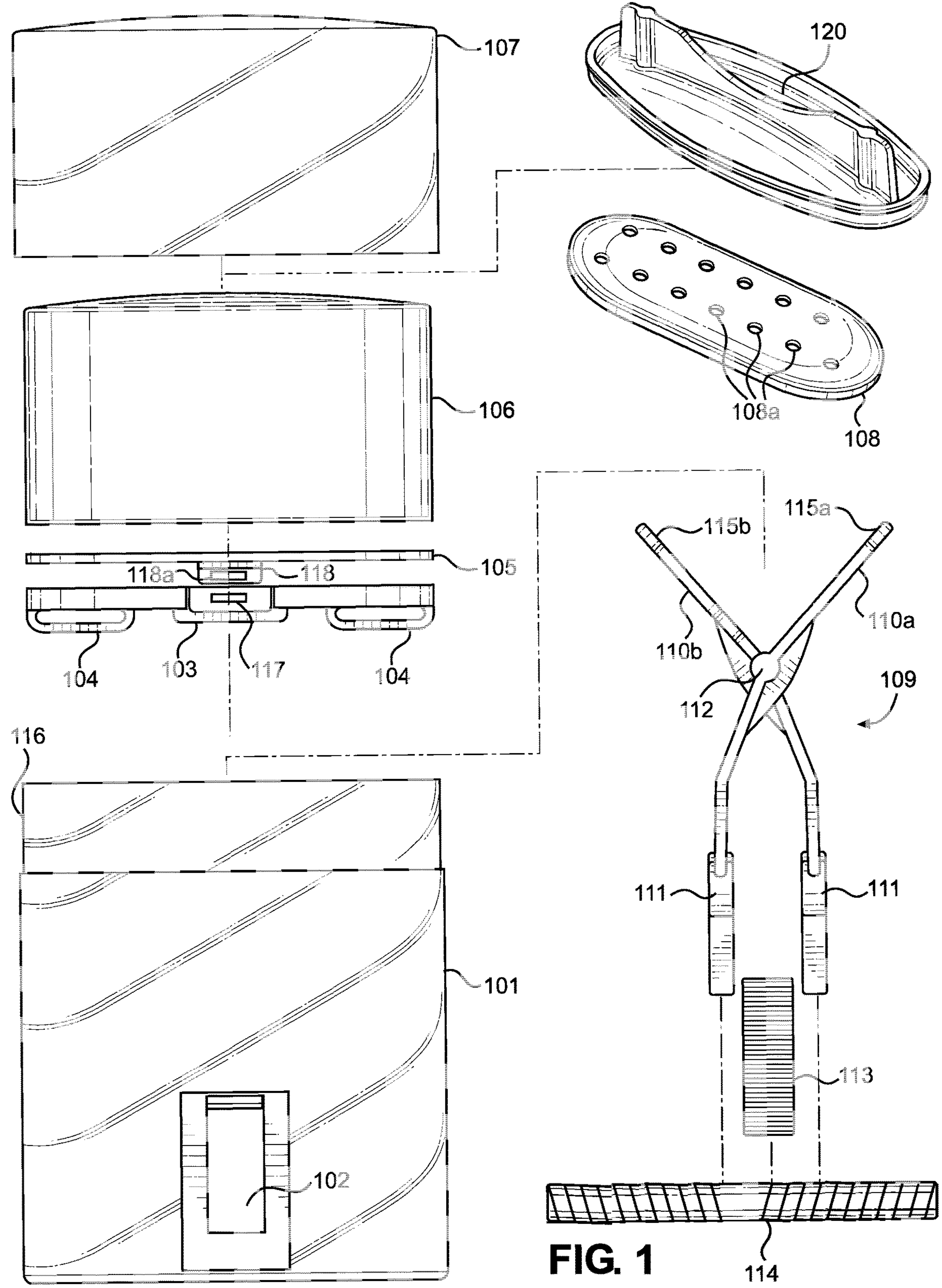
FIG. 1 shows an exploded view of an embodiment of the solution refill cartridge device in use with a repeatedly refillable reusable dispenser.

Reference is made herein to the attached drawings. Like reference numerals are used throughout the drawings to depict like or similar elements of the refillable dispenser housing. For the purposes of presenting a brief and clear description of the present invention, a preferred embodiment will be discussed as used for the refillable dispenser housing. The figures are intended for representative purposes only and should not be considered to be limiting in any respect.

Referring now to FIG. 1, there is shown an exploded view of an embodiment of the solution refill cartridge device 100 in use with a repeatedly refillable reusable dispenser. The solution refill cartridge device 100 includes a housing 101 having a base and a formed side with perimeter sidewalls creating an open end that provides access to an interior volume that receives a solution. The sidewall has an aperture 102 located therethrough. In one embodiment, there is a first aperture 102 located through the sidewall on one side and a second aperture is located on the sidewall opposite the first aperture and in alignment therewith. In one embodiment, the sidewall is configured to have a lip 116 located about a top end. The lip 116 is configured to accept a lid 107 thereon. The lid 107 is configured to have a friction fit.

In one embodiment, there is a cap 108 configured to fit within the open top end. The cap is configured to be removably placed within the open top end. In the illustrated embodiment, the cap 108 has a lip placed there around. The lip will prevent the cap from being placed too far into the housing 101. The cap 108 has a plurality of apertures **108*a* located therethrough. The plurality of apertures 108*a* will allow gel substances to be pushed therethrough. The cap 108 has a smooth upper surface. In one embodiment, the cap 108** has a rounded arch shape. This shape will better conform to and spread deodorant to an underarm.

In one embodiment there is further a freshness sealing cap 120. The freshness sealing cap 120 is configured to be placed on the top of the container 101. In one embodiment the freshness sealing cap is made from polyvinyl alcohol. This will allow the freshness sealing cap 120 to be biodegradable and disposable. The freshness sealing cap 120 will keep the spreadable substance fresh for an extended period of time.

The interior of the housing 101 contains a movable dispenser base 103. The movable dispenser base 103 is shaped to movably fit within the housing 101. The movable dispenser base 103 has a top side and a bottom side. The bottom side of the movable dispenser base 103 has a pair of attachment apertures 104. In one embodiment the attachment apertures 104 are elongated apertures. This will allow the attachment device **115*a*, 115*b* (described below) to slide horizontally within the apertures. This will better enable the scissor lift 109** (described below) to rise and lower.

The top side of the movable dispenser base 103 is configured to fit a substance attachment clip 105. In one embodiment, the substance attachment clip 105 is made from a biodegradable substance. In a further embodiment the substance is formed polyvinyl alcohol. In another embodiment the substance is paper covered in polyvinyl alcohol. In one embodiment the substance attachment clip 105 is dissolvable in an aqueous media. This will allow the attachment clip to eliminate space in landfills.

The movable dispenser base 103 has a protruding pin 117 located on at least one side thereof. The protruding pin 117 is configured to fit within an aperture **118*a* located on a tongue 118 attached to the substance attachment clip 105. In one embodiment the substance attachment clip 105 creates a waterproof seal with the sides of the housing 101. This will prevent gel substances from leaking into the housing below the movable dispenser base 103. In one embodiment the substance attachment clip 105 is configured to removably attach to the top side of the movable dispenser base 103**.

The interior of the housing 101 further contains a scissor lift 109. The scissor lift 109 is comprised of a first side 110*a* and a second side 110*b*. The first side 110*a* and the second side 110*b* are attached with a rotating pin device 112. This device will allow the first side 110*a* and the second side 110*b* to rotate. The scissor lift 109 has an attachment device 115*a*, 115*b*. The attachment device is configured to slidably connect to the attachment apertures of the movable dispenser base 103. In one embodiment the attachment device 115*a*, 115*b* is a hook. At the opposite end of each side 110*a*, 110*b* there is an attachment 111 located at the bottom of each side 110*a*, 110*b*. In one embodiment the attachment 111 has a threaded portion.

The threaded portion within the attachment 111 is configured to attach to a screw rod 114. The screw rod 114 has threads located thereon. The threads are configured such that when the screw rod 114 is rotated, both attachments 111 will move towards each other; or away from each other respectively. In this manner, the scissor lift 109 will extend or collapse. In one embodiment the threads are configured to move the scissor lift in a large amount with only a small turn. For example, in one embodiment, one full rotation of the screw rod 114 will move the scissor lift 109 halfway into the extend position from fully collapsed. The screw rod 114 has a knob 113 attached. The knob 113 is configured to be wider that the screw rod 114. In one embodiment the knob 113 has a texture located around the outer edge. The texture will make the knob easier to turn.

The refillable dispenser is configured to hold a spreadable substance 106. In one embodiment, the spreadable substance 106 is a solid substance. In another embodiment, the spreadable substance 106 is wrapped in a biodegradable container. The container is removed and the spreadable substance 106 is inserted into the housing. In one embodiment the spreadable substance 106 is attached to the movable dispenser base 103 using a substance attachment clip 105.

In some embodiments the spreadable substance 106 is a gel substance. In this embodiment, the gel substance is located within a removable cartridge. In one embodiment the cartridge is a biodegradable cartridge. In one embodiment the cartridge is dissolvable in an aqueous media. In some embodiments that cartridge is a collapsible cartridge. This will allow for a gel substance to remain the in cartridge and be squeezed therefrom. In another embodiment the cartridges is designed to be removed from a solid spreadable substance and only the substance is placed in the housing 101. The cartridge is placed within the house 101 by attaching the attachment clip 105 to the movable dispenser base 103. The cap 108 is then attached to the open top end of the housing 101. As the spreadable substance 106 is pushed up and out of the cap 108 the cartridge will collapse.

Figure 2:
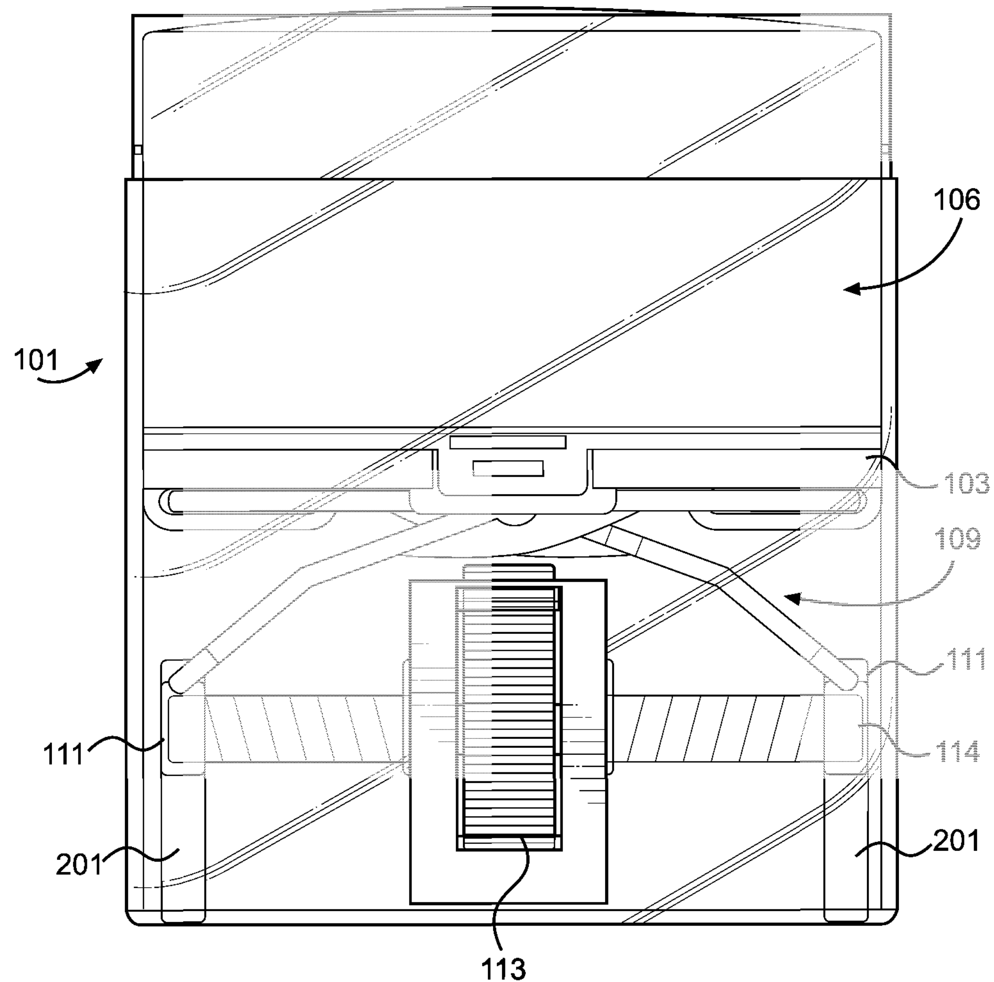
FIG. 2 shows a front view of an embodiment of the solution refill cartridge device in use with a repeatedly refillable reusable dispenser in a collapsed position.

Referring now to FIG. 2, there is shown a front view of an embodiment of the repeatedly refillable reusable dispenser in a collapsed position. In the collapsed position, the scissor lift 109 is flattened such that it rests directly over the knob 113. In this position the scissor lift 109 will be at the outer edge of the screw rod 114. The movable dispenser base 103 will be lowered into the housing 101. The spreadable substance 106 will be positioned such that it is fully encapsulated within the housing 101.

In one embodiment the threaded attachment 111 has an elongated member 201 attached to a lower part thereof. The elongated member 201 is configured to allow the threaded attachment 111 to still attach to the screw rod 114. This is due to the fact that the elongated member 201 is located below the threaded attachment 111. The elongated member 201 is long enough that it will reach the bottom of the housing 101. This will take the weight of the spreadable substance 106 away from the scissor lift 109. The weight from the spreadable substance 106 will be displaced to the bottom of the housing 101.

Figure 3:
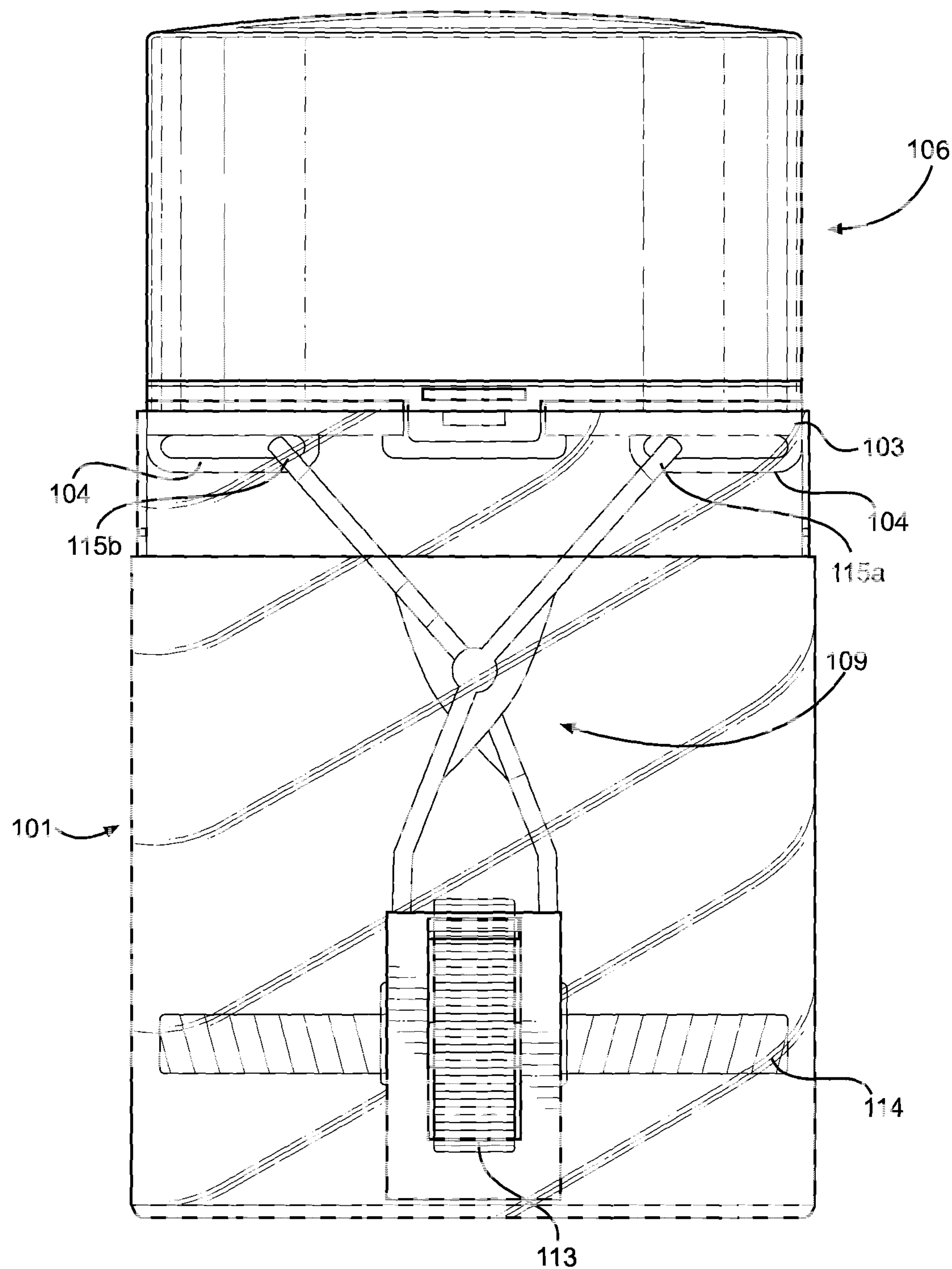
FIG. 3 shows a front view of an embodiment of the solution refill cartridge device in use with a repeatedly refillable reusable dispenser in an expanded position.

Referring now to FIG. 3, there is shown a front view of an embodiment of the repeatedly refillable reusable dispenser in an expanded position. In the expanded position the scissor lift 109 is in an extended position. As the movable dispenser base 103 is lifted by the scissor lift 109 the attachment device 115*a*, 115*b* will slide within the connection apertures 104. As the scissor lift 109 is pulled closer to the knob on the screw rod 114, the scissor lift 109 will force the movable dispenser base 103 upward. This will push the spreadable substance 106 out of the open top end of the housing 101.

Figure 4:
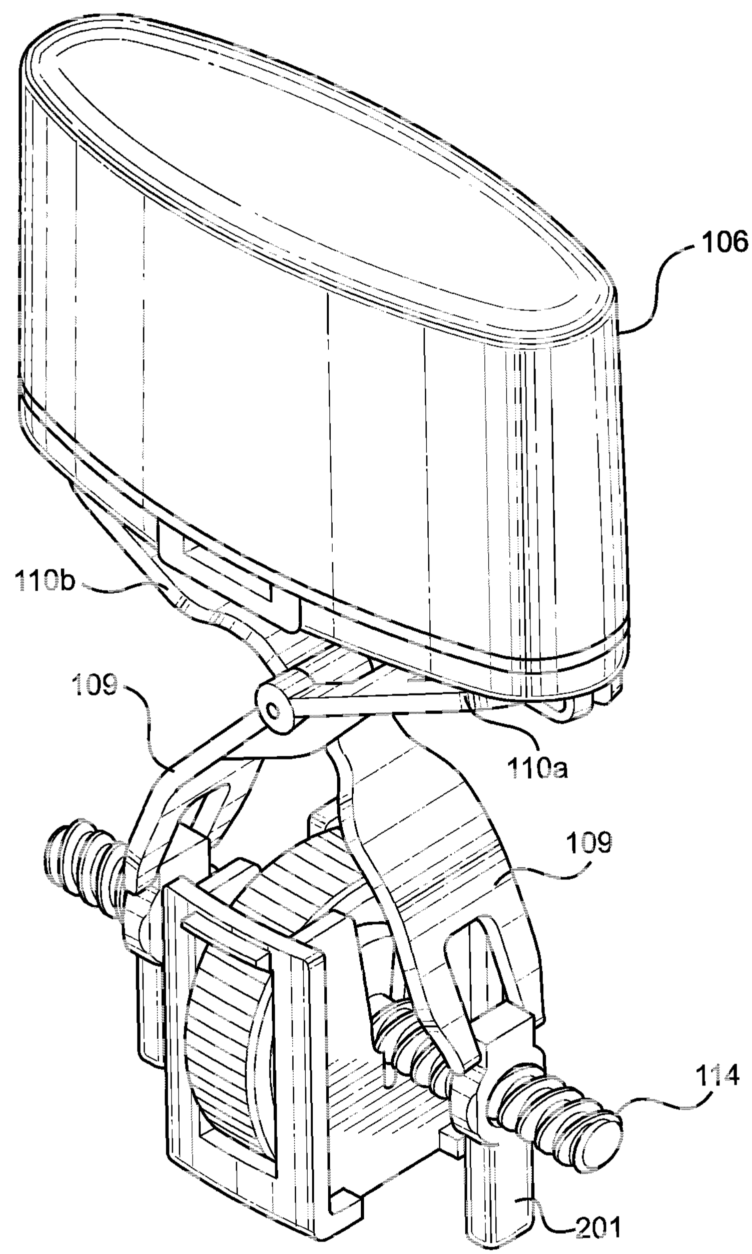
FIG. 4 shows a perspective view of an embodiment of the solution refill cartridge device in use with a repeatedly refillable reusable dispenser without the housing.

Referring now to FIG. 4, there is shown a perspective view of an embodiment of the mechanism designed be placed within the housing. In the shown embodiment, the screw rod 114 is shown to have coarse or large threads. These threads will allow for the scissor lift 109 to be moved a large amount with a small turn. Further, there is shown a side view of the elongated member 201. The elongated member 201 is configured to be large enough to take the weight from the spreadable substance 106. In the shown embodiment the scissor lift 109 has a wide flat first side 110*a* and second side 110*b*.

Figure 5:
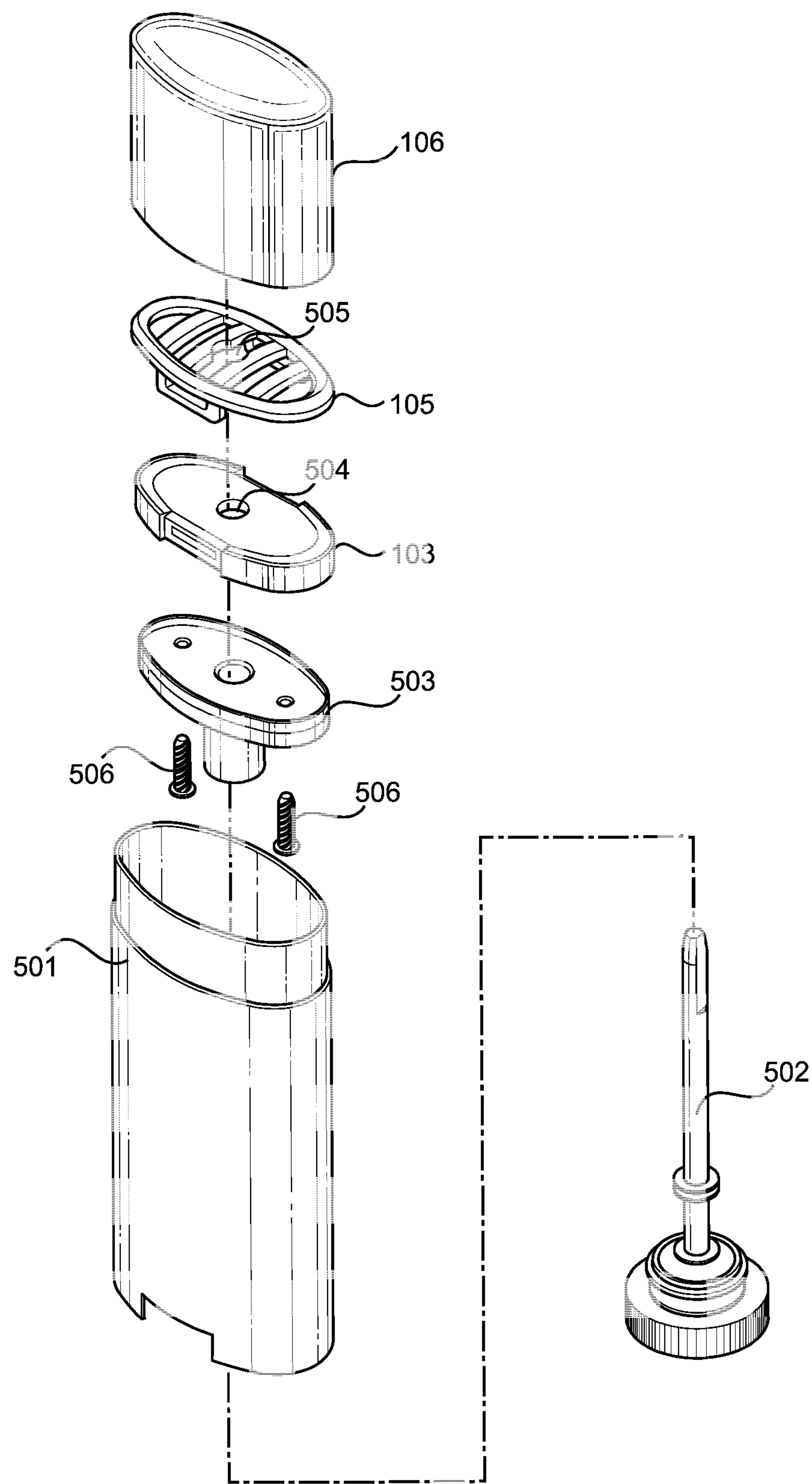
FIG. 5 shows an exploded view of an embodiment of the solution refill cartridge device in use with a repeatedly refillable reusable dispenser.

Referring now to FIG. 5, there is shown an exploded view of an embodiment of a dispensing mechanism designed to work with an existing container. The existing container 501 has an existing vertical screw rod 502. The vertical screw rod 502 is configured to rise and lower an existing base 503. In this embodiment the movable base 103 is configured to attach to the existing base 503. In the shown embodiment the existing base 503 and the movable base 103 are attached using screws 506. In another embodiment other securement devices may be used.

In the shown embodiment the movable base 103 is configured to have an aperture 504 placed in the middle thereof. The aperture 504 is configured to allow the vertical screw rod 502 to be placed therethrough. Further, the attachment clip 105 is configured to have an aperture 505 placed therethrough. The aperture 505 is configured to have the vertical screw rod 502 placed therethrough. In this embodiment the spreadable substance 106 is able to be replaced as needed, without replacing the entire container.

In another embodiment the movable base 103 is applied directly to the screw rod 502. This will remove the need for the existing base 503 and the fasteners 506. In this embodiment the movable base 103 then has an attachment clip 105 secured thereto. The attachment clip 105 will secure a spreadable substance to the screw rod 502 allowing it to be dispensed as needed.

Figure 6:
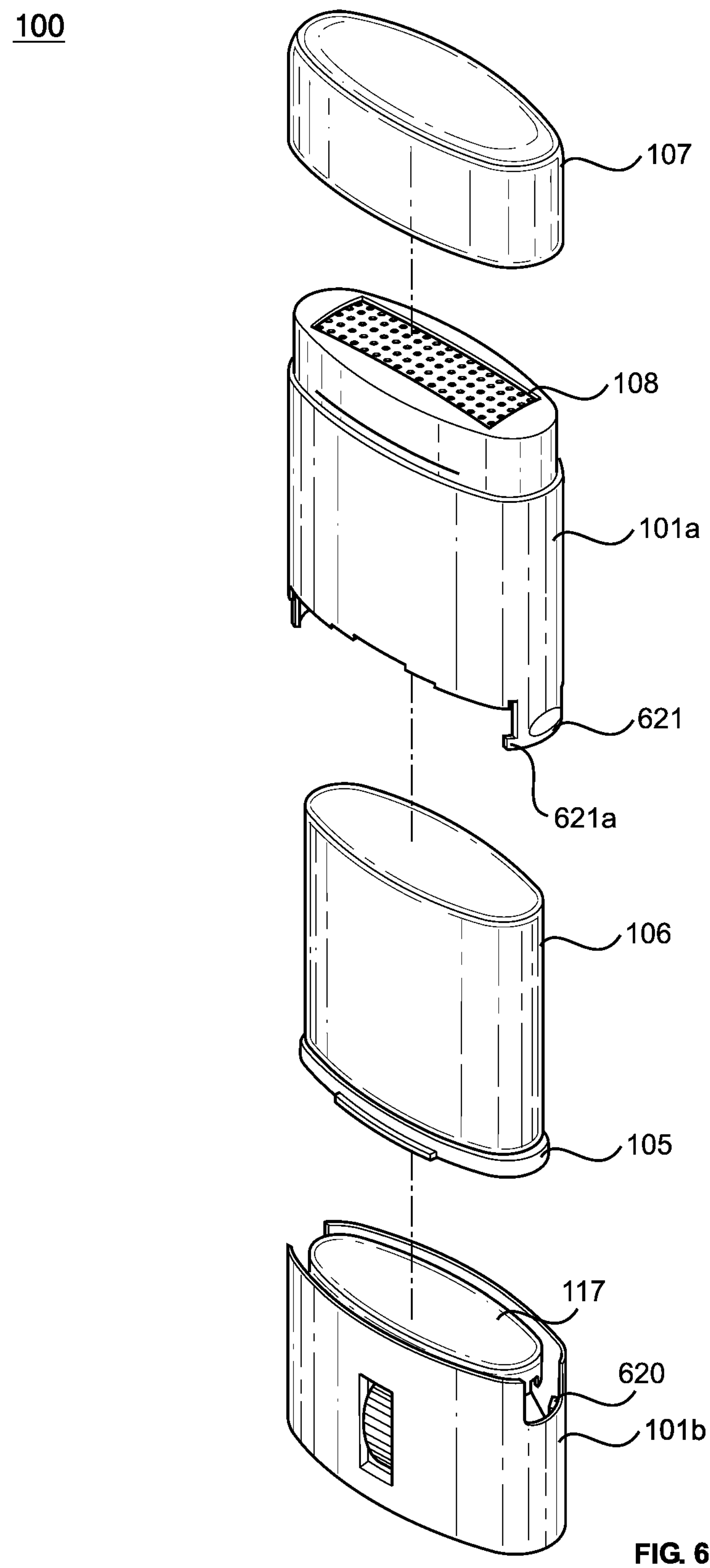
FIG. 6 shows an exploded view of an embodiment of the solution refill cartridge device in use with a repeatedly refillable reusable dispenser.

Referring now to FIG. 6, there is shown an exploded view of an alternate embodiment of the repeatedly refillable reusable dispenser. In the shown embodiment the housing can be separated into two sections, an upper section 101*a* and a lower section 101*b*. The lower section of the housing 101*b* houses a scissor lift and parts associated with the scissor lift. The scissor lift can then be attached to the attachment clip 105 of the spreadable substance cartridge via a corresponding fastener 117. The upper section of the housing 101*a* is removably securable to the lower section of the housing 101*b*. The upper section of the housing 101*a* has a pair of securement members 621 that will secure the upper section of the housing 101*a* to the lower section of the housing 101*b*. In one embodiment the securement happens by by mating the securement members 621 to interior notches 620 located within the lower section of the housing 101*b*. The securement member 621 have protrusions 621*a* that will fit within the interior notches 621*a* holding the upper section 101*a* to the lower section 101*b*.

In the shown embodiment, a cap 108 is secured to the upper section of the housing 101*a*, as previously described in relation to FIG. 1, above. The lid 107 can removably secure to the upper section of the housing 101*a* as previously described in FIG. 1, above.

Figure 7:
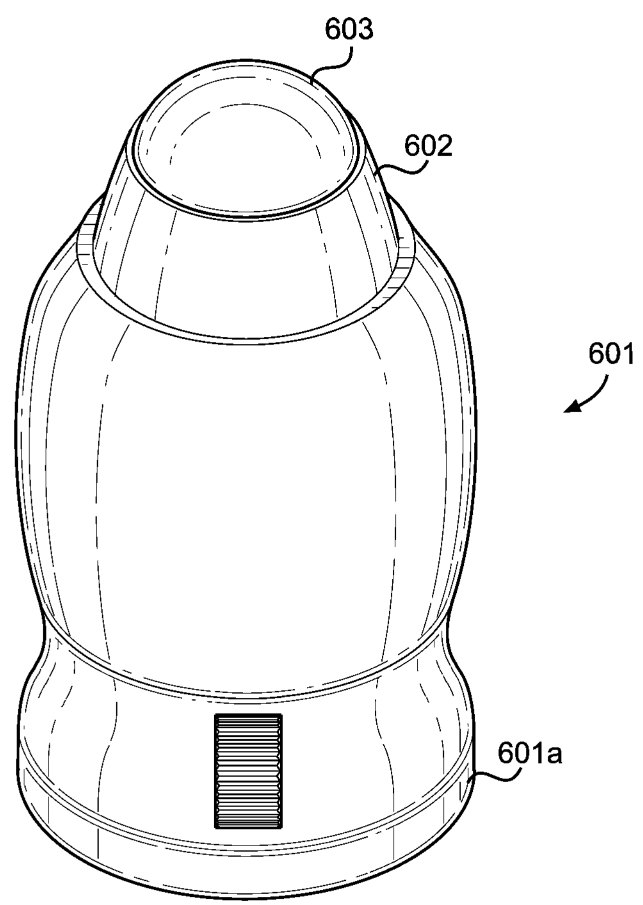
FIG. 7 shows a perspective view of an alternate embodiment of the solution refill cartridge device in use with a repeatedly refillable reusable dispenser having a roll-on applicator.

Referring now to FIG. 7, there is shown a perspective view of an alternate embodiment of the repeatedly refillable reusable dispenser having a roll-on applicator. The roll-on dispenser is comprised of a housing 601 which includes a base 601*a* and an open upper end, which can be seen in FIG. 8. The housing 601 has an interior volume adapted to receive parts of the dispenser. In one embodiment the housing 601 is made from plastic.

In one embodiment the housing 601 has an ergonomic shape. In the shown embodiment, the housing 601 has a wider base 601*a* which narrows toward the middle of the housing 601. The housing 601 then widens again toward the open upper end. This will allow the housing 601 to be easily grasped by a user.

The open upper end of the housing 601 is removably attached to an upper section 602. The upper section 602 narrows further towards an opening. The opening houses a roller ball 603. The roller ball 603 will work with interior components to spread a substance onto a user as desired. In one embodiment, the roller ball 603 partially protrudes from the upper section 602.

Figure 8:
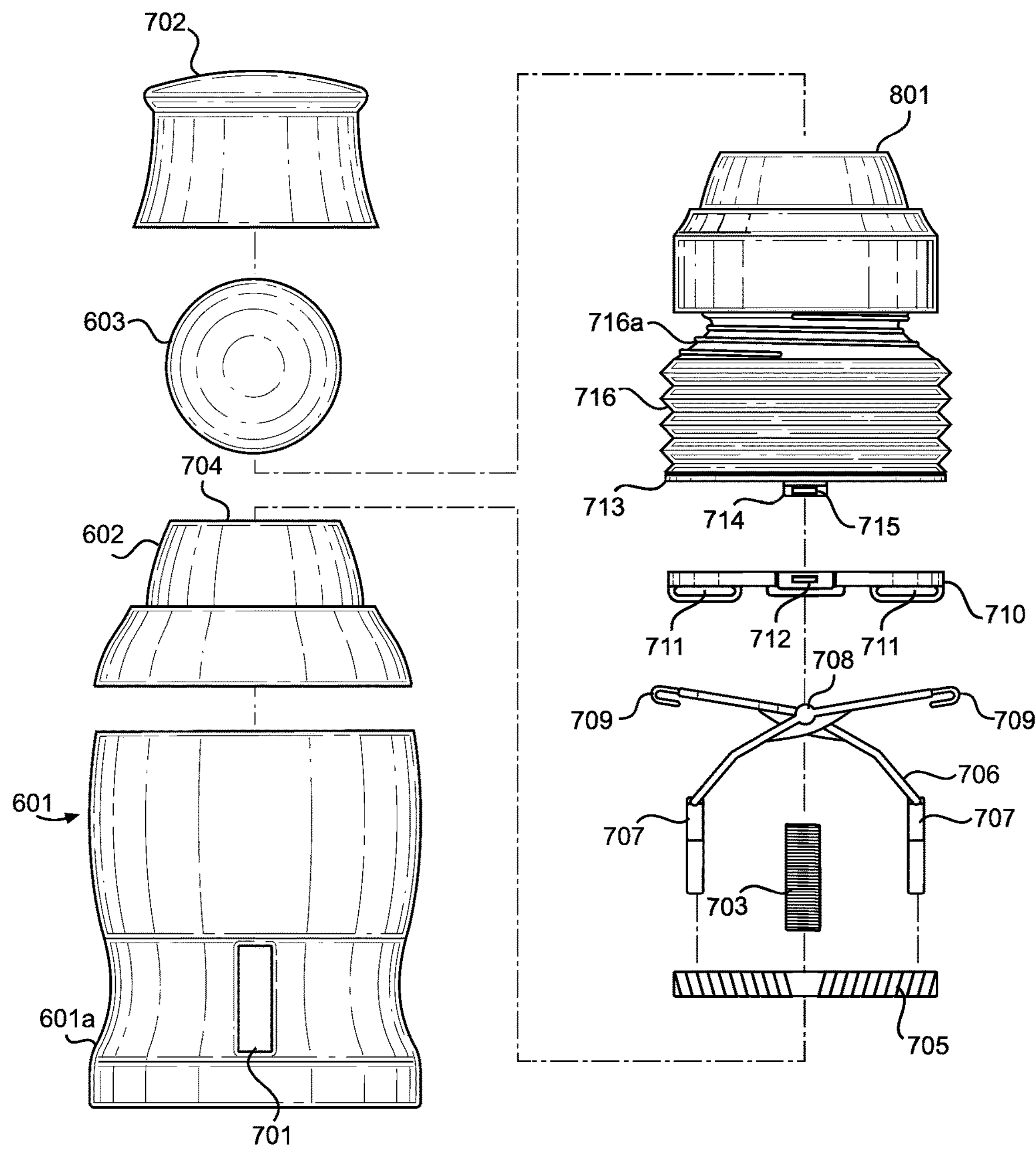
FIG. 8 shows an exploded view of an alternate embodiment of the solution refill cartridge device in use with a repeatedly refillable reusable dispenser having a roll-on applicator.

Referring now to FIG. 8, there is shown an exploded view of an alternate embodiment of the repeatedly refillable reusable dispenser having a roll on applicator. The housing 601 has an aperture 701 located near the base 601*a*. The aperture 701 is proportioned to fit a portion of a turn knob 703 which is part of the dispensing device. The housing 601 further includes a lid 702. The lid 702 is configured to removably attach to the upper section 602 and is contoured to cover portion of the roller ball 603 which will be protruding when the device is put together. In one embodiment the lid 702 snaps to the housing 601 and is frictionally held in place. In another embodiment the housing 601 will have threading thereon. The interior of the lid 702 will have threads therein. The lid 702 will be threaded onto the housing 601 to be held in place.

In the shown embodiment, the upper section 602 does not include the roller ball 603 therein. In one embodiment the upper section 602 is snap fit to the housing 601. In another embodiment the upper section 602 is threaded on to the housing 601. In the shown embodiment the upper section will fit flush with the housing 601 such that there is smooth connection. The opening 704 of the upper section 602 is proportioned such that the diameter of the roller ball is smaller than the opening 704. This will ensure that the roller ball cannot fall from the upper section 602.

The interior of the housing 601 holds a dispensing device. The dispensing device is comprised of a threaded rod 705. In one embodiment the threading on threaded rod 705 is a coarse threading. The threading on the threaded rod 705 moves such that the threading starts at the ends of the rods and moves towards the center of the threaded rod 705. The threaded rod is connected to the turn knob 703.

The turn knob 703 will allow the users to turn the threaded rod 705 by turning the turn knob 703. The threaded rod is further connected to a scissoring lift 706. The scissoring lift is comprised of two scissor sides connected by a pivot 708. The scissoring lift 706 will attach to the threaded rod 705 via threaded apertures 707 located at the lower ends of each side of the scissoring lift 706. The upper ends of the scissoring lift 706 have connectors 709 located thereon. In one embodiment the connectors 709 are hooks.

The connectors 709 of the scissoring lift 706 will attached to a cartridge compression plate 710. The cartridge compression plate 710 has a plurality of apertures 711 located on a bottom side thereof. In one embodiment the apertures 711 are elongated apertures. This will allow the connectors 709 from the scissoring lift 706 to move side to side as the scissor lift 706 moves.

The cartridge compression plate 710 has a connection prong 712. The connection prong 712 will attach to a cartridge connection plate 713. The cartridge connection plate 713 has a protrusion 714 located on the underside of the cartridge connection plate 713. The protrusion 714 has an aperture 715 location therein. The connection prong 712 will secure within the aperture 715 holding the cartridge compression plate 710 to the cartridge connection plate 713.

The cartridge connection plate 713 creates the bottom of a cartridge 716. In one embodiment the cartridge 716 is made from plastic. In another embodiment the cartridge 716 is made from paper products. In one embodiment the cartridge 716 is dissolvable in an aqueous media. In one embodiment the cartridge 716 has an accordion design. This will allow the cartridge 716 to fold down as compressed. In some embodiments the cartridge 716 has an upper protrusion 716*a*. The upper protrusion 716*a* will connect to the solution chamber 801 and the roller ball 603 as described in FIG. 10.

Figure 9:
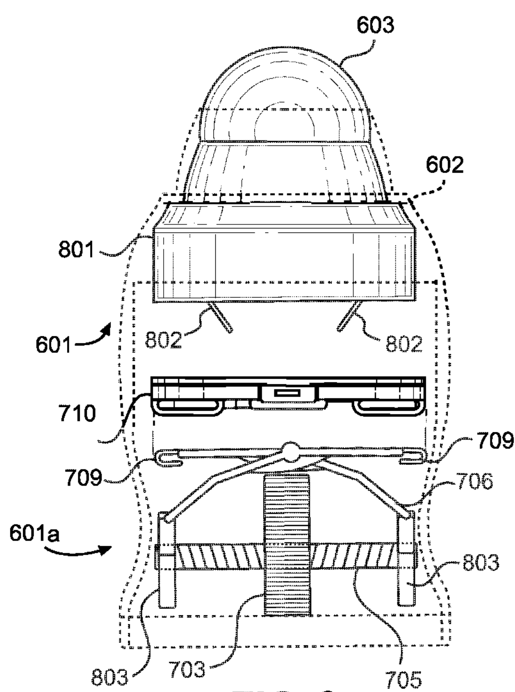
FIG. 9 shows a cross-sectional view of an alternate embodiment of the solution refill cartridge device in use with a repeatedly refillable reusable dispenser having a roll-on applicator.

Referring now to FIG. 9, there is shown cross-sectional view of an alternate embodiment of the repeatedly refillable reusable dispenser having a roll-on applicator. The upper section 602 of the housing 601 has a solution chamber 801 located therein. The solution chamber 801 connects to the top side of a cartridge. In one embodiment the solution chamber 801 will connect to the protrusion of the cartridge. The solution from the cartridge will enter the solution chamber 801 and contact the roller ball 603.

The solution chamber 801 has an upper side that is configured to accept a portion of the roller ball 603. The roller ball 603 will have the ability to float slightly between the solution chamber 801 and the opening in the upper section 602. The solution chamber 801 along with the proportions of the opening of the upper section 602 the roller ball 603 will be held within the dispenser. This will prevent the roller ball 603 from becoming lost.

In some embodiments the solution chamber 801 has a cartridge opening device 802. In this embodiment when the cartridge is connected the device will puncture the cartridge allowing solution to exit the cartridge. In one embodiment the cartridge opening device 802 is a blade. In another embodiment the cartridge opening device 802 is a poker.

In this view the components of the dispensing device can be seen within the housing 601. The turn knob 703 is located within the aperture of the housing 601. The turn knob 703 is secured to the threaded rod 705. The scissor lift 706 is connected at one end to the threaded rod 705. The connectors 709 of the scissor lift 706 are connected to the cartridge compression plate 710. In the shown embodiment there are additional support braces 803 connected to the threaded apertures 707 of the scissor lift. The support braces 803 will contact the base 601*a* of the housing 601. This will wake pressure off of the threaded rod 705 and place the pressure on the base 601*a*.

Figure 10:
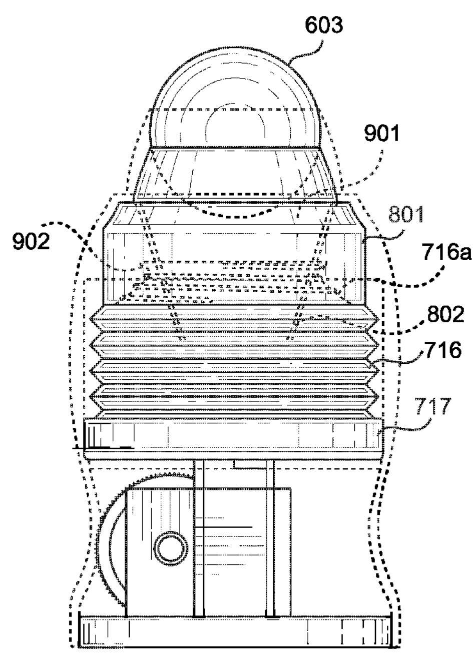
FIG. 10 shows a cross-sectional view of an alternate embodiment of the solution refill cartridge device in use with a repeatedly refillable reusable dispenser having a roll-on applicator.

Referring now to FIG. 10, there is shown cross-sectional view of an alternate embodiment of the repeatedly refillable reusable dispenser having a roll-on applicator. In this view there is a solution cartridge 716 placed within the dispenser. The solution cartridge 716 is secured to the cartridge compression plate 710 via the cartridge connection plate 713. The upper end of the cartridge 716 is connected to the solution camber 801. A solution 901 can be seen filling the cartridge 716 and the solution chamber 801. The solution is then spread along the roller ball 603.

The turn knob 703 is used to activate the dispensing device. In one embodiment the dispensing device is used to apply pressure to the contents of the cartridge 716. This will force solution in to the solution chamber 801 and onto the ball. In other embodiments the dispensing device is used to slowly compress the cartridge gradually releasing solution. In one embodiment the dispensing device will over compress the cartridge 716 which will ensure that all of the contents of the cartridge is dispelled.

In the shown embodiment the cartridge has an upper protrusion 716*a* that will enter the solution chamber 801. The upper protrusion is configured to fit around the opening device 802. The opening device 802 will open the cartridge 713. The upper protrusion 716*a* has a plurality of threads 902 location on one side thereof. There interior if the solution chamber 801 will have a matching set of threading. This will allow the cartridge 713 to be threaded into the solution chamber 801.

Figure 11:
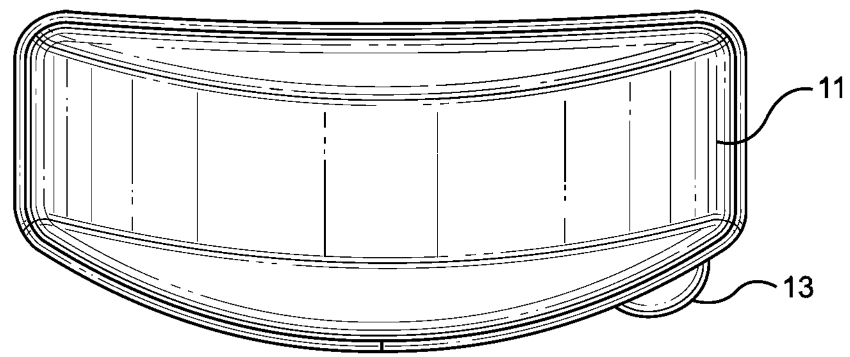
FIG. 11 shows a top down view of an alternate embodiment of the solution refill cartridge device in use with a repeatedly refillable reusable dispenser.

Referring now to FIG. 11, there is shown an exploded view of an embodiment of a repeatedly refillable reusable retro-fit dispenser. The retro-fit dispenser has a housing 501. The housing 501 has a bottom side and an open top end. The housing has a screw rod 502 rotatably secured into the bottom of the housing. The screw rod has threading along the length of the screw rod 502. One end of the screw rod 502 there is a turn knob 502*a*. The housing 501 has a lid 106 that is proportioned to frictionally engage with the open top end of the housing 501.

In the shown embodiment there is a cartridge plate 1102 shown. The cartridge plate 1102 has a threaded aperture 1101 located through the cartridge plate 1102. This threaded aperture 1101 will allow the cartridge plate 1102 to engage the screw rod 502. In one embodiment the cartridge plate is made from poly vinyl alcohol. In another embodiment the cartridge plate 1201 is made from a cellulose and poly vinyl alcohol mixture.

In the shown embodiment the cartridge plate 1102 has a domed shape. This means that the middle of the cartridge plate 1102 is rounded in an upward manner. This will allow for a channel 1101*a* to be disposed under the cartridge plate 1102 and secured about the threaded aperture 1101. In one embodiment the channel 1101*a* is a threaded channel. This will allow the channel to also engage with the screw rod 502 adding additional support to the cartridge plate 1102. The cartridge plate 1102 further has a plurality of apertures 1103 therethrough. These apertures 1103 will allow for a spreadable substance to better affix to the cartridge plate 1102.

Figure 12:
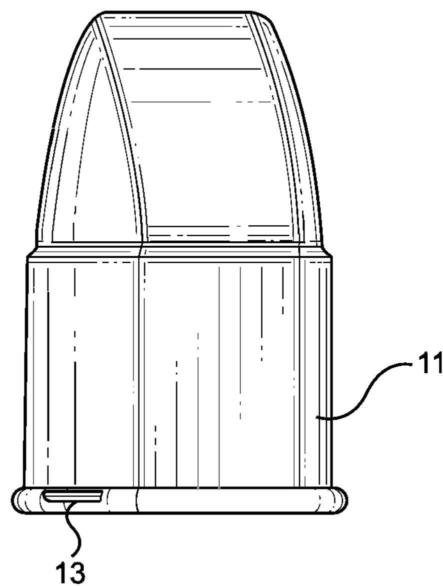
FIG. 12 shows a side view of an alternate embodiment of the solution refill cartridge device in use with a repeatedly refillable reusable dispenser.

Referring now to FIG. 12, there is shown an exploded view of an embodiment of a repeatedly refillable reusable retro-fit dispenser. The retro-fit dispenser has a housing 501. The housing 501 has a bottom side and an open top end. The housing has a screw rod 502 rotatably secured into the bottom of the housing. The screw rod has threading along the length of the screw rod 502. One end of the screw rod 502 there is a turn knob 502*a*. The housing 501 has a lid 106 that is proportioned to frictionally engage with the open top end of the housing 501.

In this embodiment of the retro-fit dispenser the cartridge plate 1201 is a flat plate. This will allow for more of the spreadable substance 1202 to be useable. In this embodiment the cartridge plate 1201 has a threaded aperture 1204 through the cartridge plate 1201. This threaded aperture will allow the cartridge plate to engage with the screw rod 502. The cartridge plate 1201 further has a plurality of apertures 1203 located therethrough. These apertures 1203 will engage a spreadable substance better affixing the cartridge plate 1201 to the spreadable substance 1202. In one embodiment the cartridge plate is made from poly vinyl alcohol. In another embodiment the cartridge plate 1201 is made from a cellulose and poly vinyl alcohol mixture.

The cartridge plate 1201 will secure to the spreadable substance 1202. Then the cartridge plate 1201 will engage the screw rod 502. The screw rod 502 will enable a user to move the cartridge plate 1201 and the spreadable substance 1202 up and down within the housing 501. This will allow for a user to spread the decided amount of spreadable substance 1202 then replace the lid 106 on the housing 501.

Figure 13:
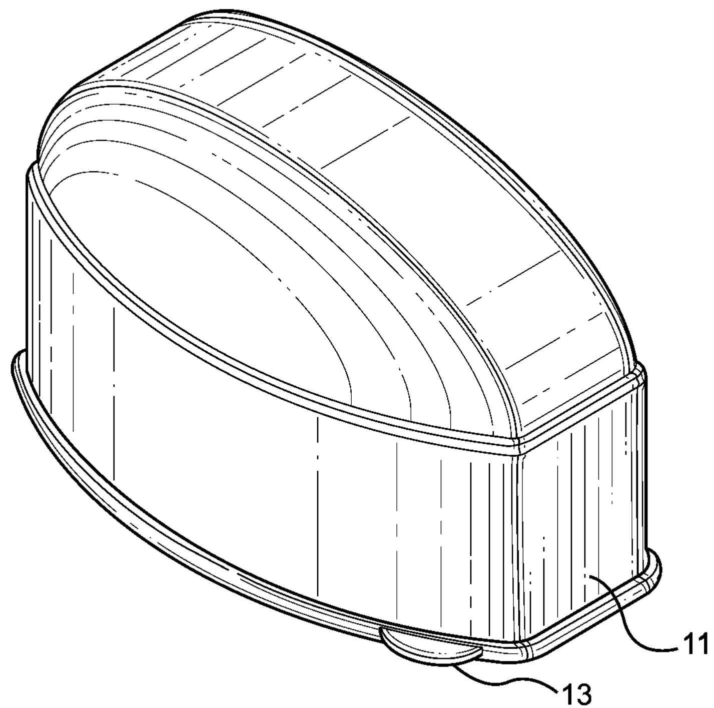
FIG. 13 shows an angled perspective view of an alternate embodiment of the solution refill cartridge device in use with a repeatedly refillable reusable dispenser
Figure 14:
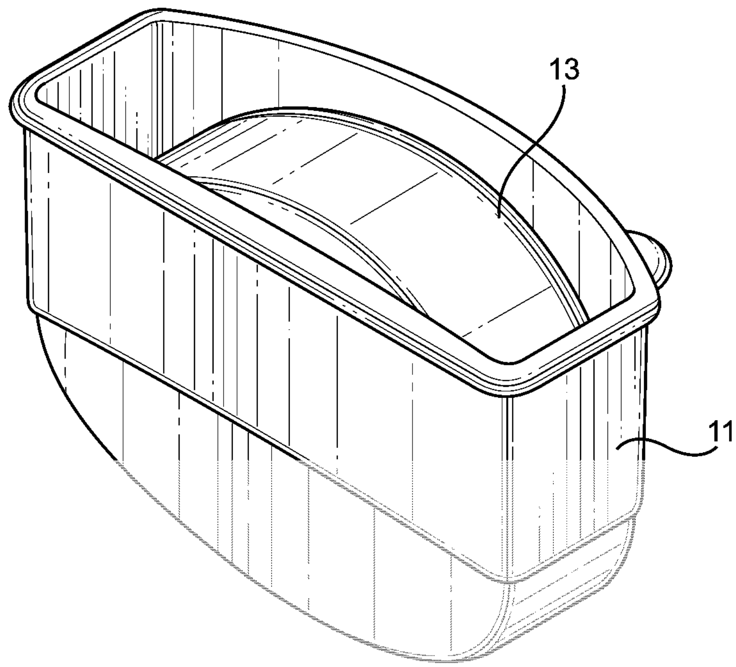
FIG. 14 shows a perspective view of an alternate embodiment of the solution refill cartridge device in use with a repeatedly refillable reusable dispenser.
Figures 15, 16:
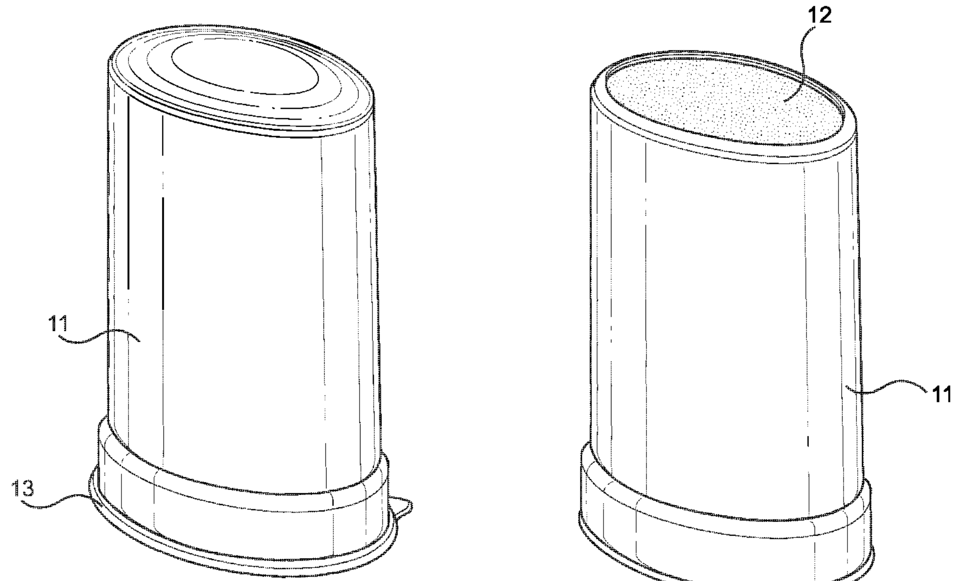
FIG. 15 shows a perspective view of an alternate embodiment of the solution refill cartridge device in use with a repeatedly refillable reusable dispenser.
FIG. 16 shows a perspective view of another alternate embodiment of the solution refill cartridge device in use with a repeatedly refillable reusable dispenser.
Figure 17:
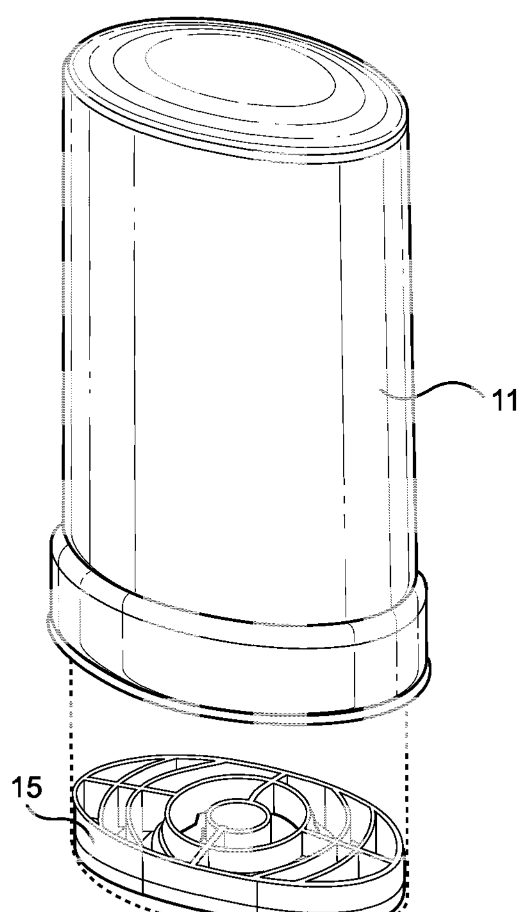
FIG. 17 shows a perspective view of another alternate embodiment of the solution refill cartridge device in use with a repeatedly refillable reusable dispenser.
Figure 18:
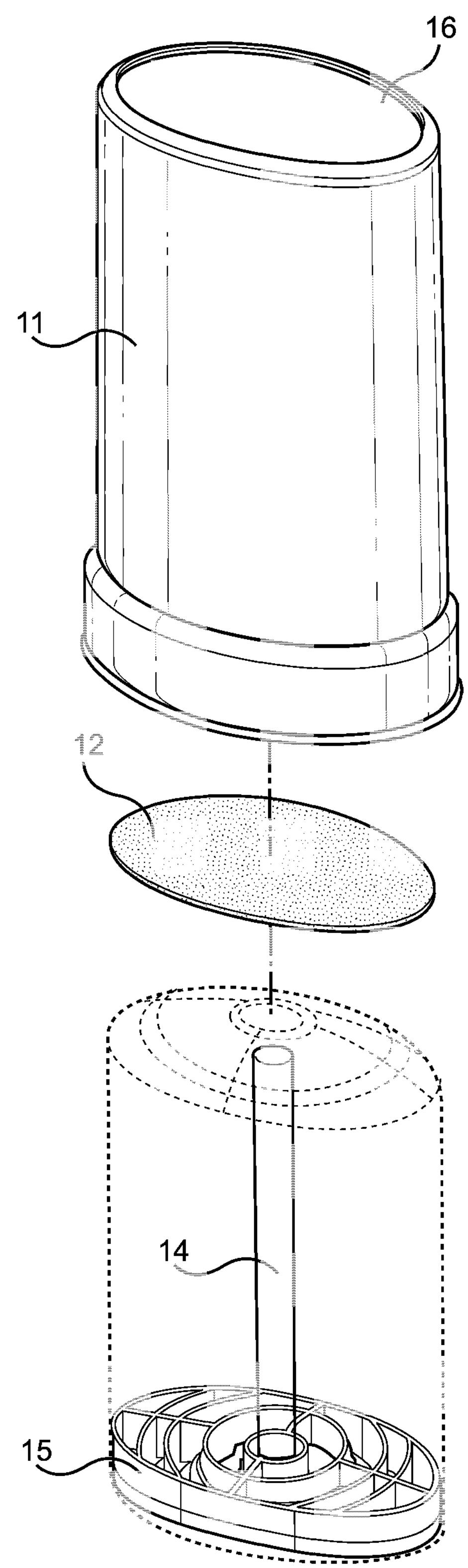
FIG. 18 shows a perspective view of another alternate embodiment of the solution refill cartridge device in use with a repeatedly refillable reusable dispenser.
Figure 19:
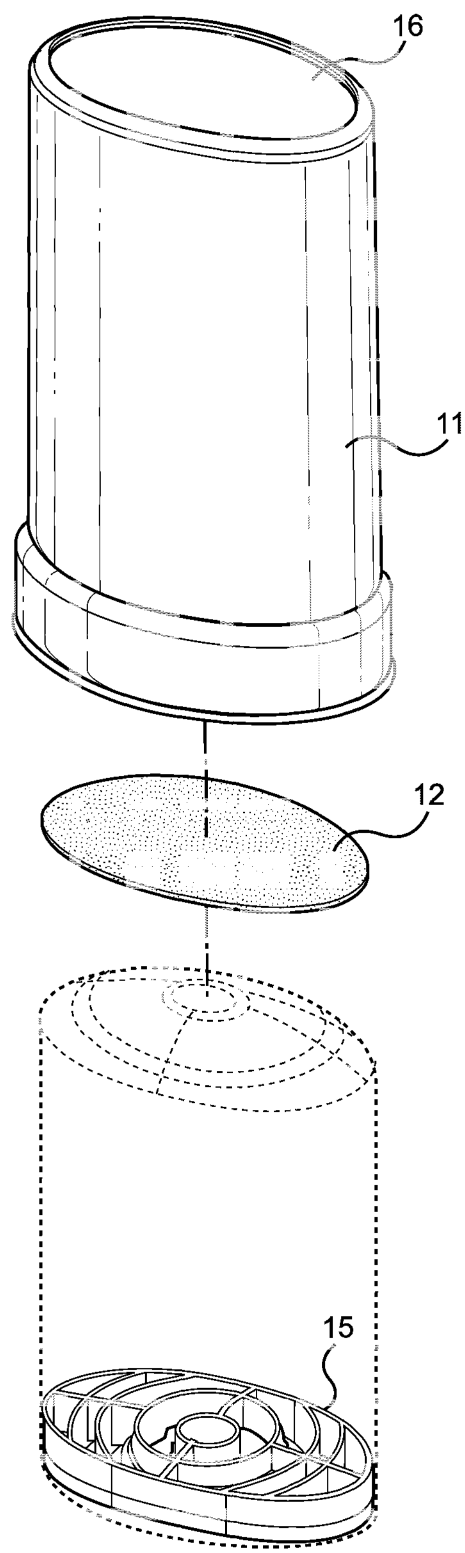
FIG. 19 shows a perspective view of another alternate embodiment of the solution refill cartridge device in use with a repeatedly refillable reusable dispenser.
Figure 20:
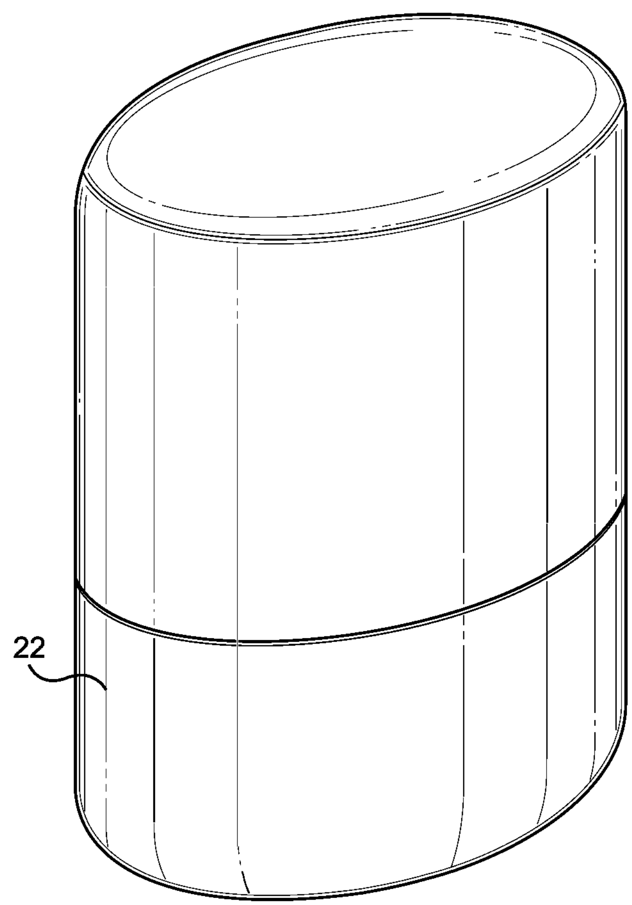
FIG. 20 shows a perspective view of another alternate embodiment of the solution refill cartridge device in use with a repeatedly refillable reusable dispenser.
Figure 21:
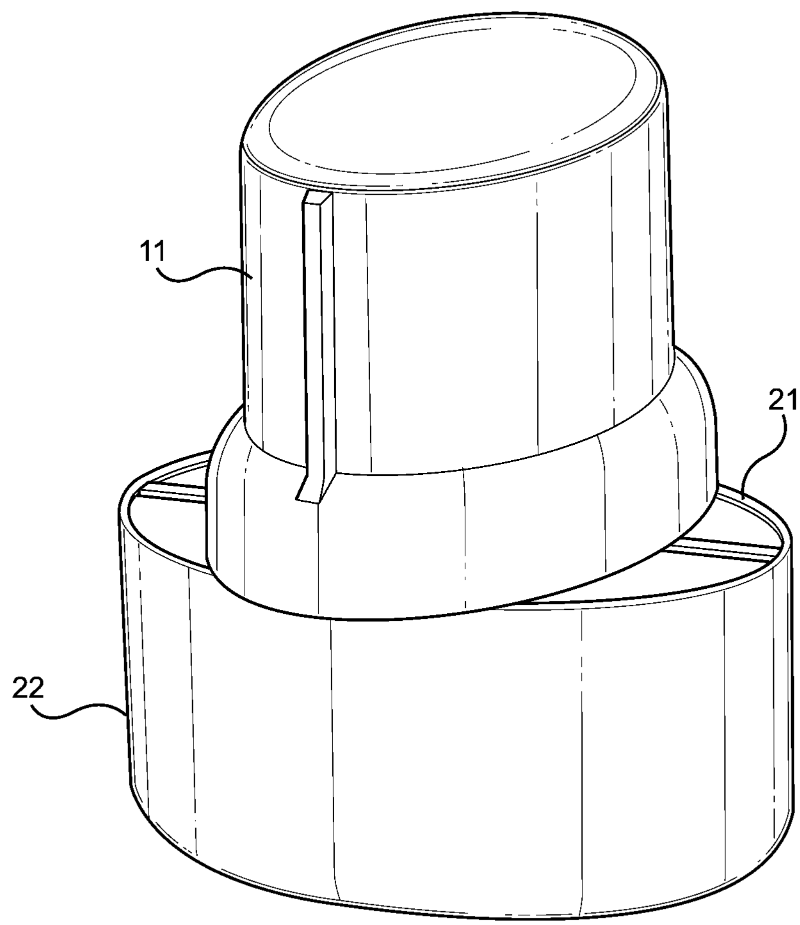
FIG. 21 shows a perspective view of another alternate embodiment of the solution refill cartridge device in use with a repeatedly refillable reusable dispenser.
Figure 22:
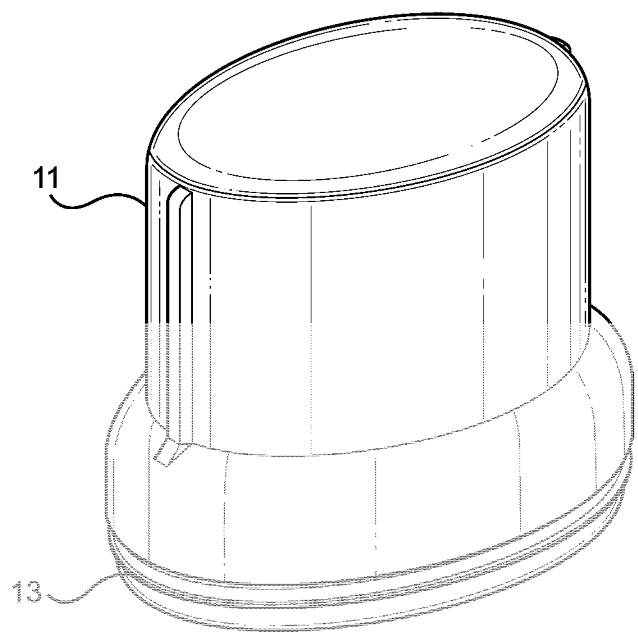
FIG. 22 shows a perspective view of another alternate embodiment of the solution refill cartridge device in use with a repeatedly refillable reusable dispenser showing rotational attachment.
Figure 23:
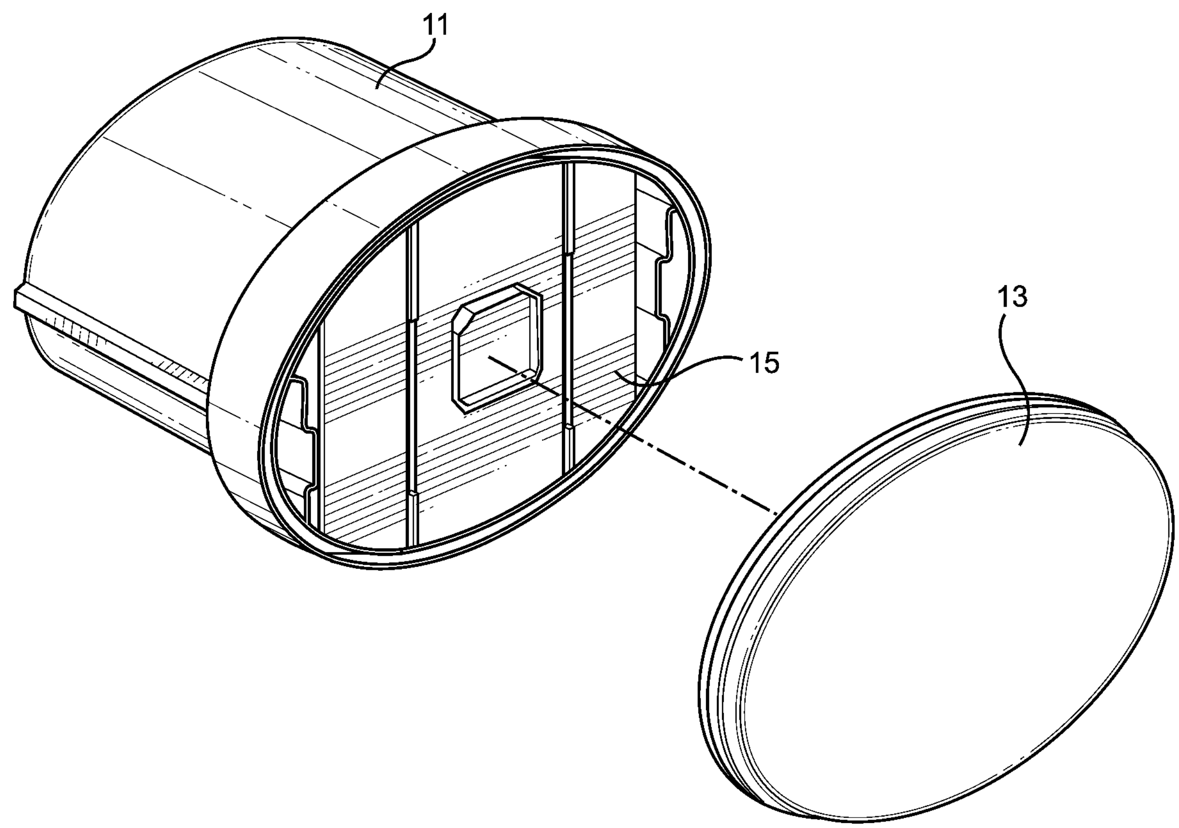
FIG. 23 shows a perspective view of another alternate embodiment of the solution refill cartridge device in use with a repeatedly refillable reusable dispenser.
Figure 24:
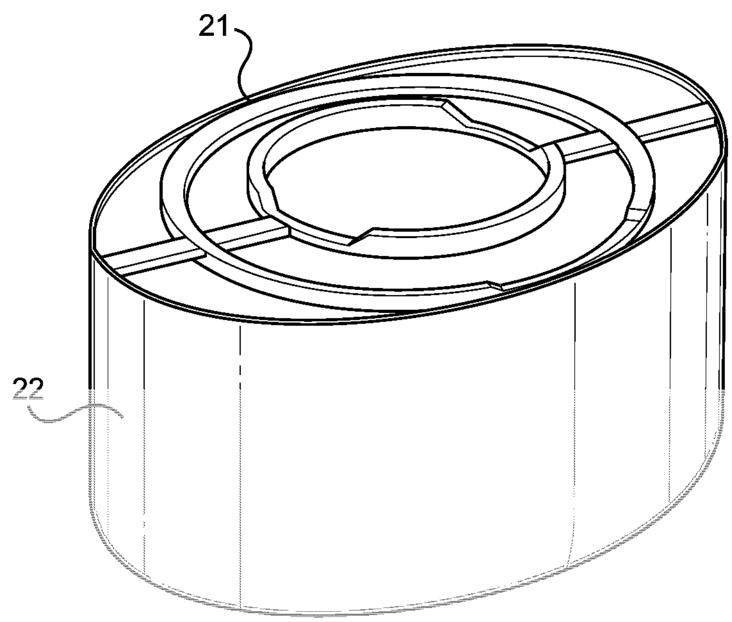
FIG. 24 shows a perspective view of another alternate embodiment of the solution refill cartridge device in use with a repeatedly refillable reusable dispenser showing the coupling mechanism.
Figures 25, 26:
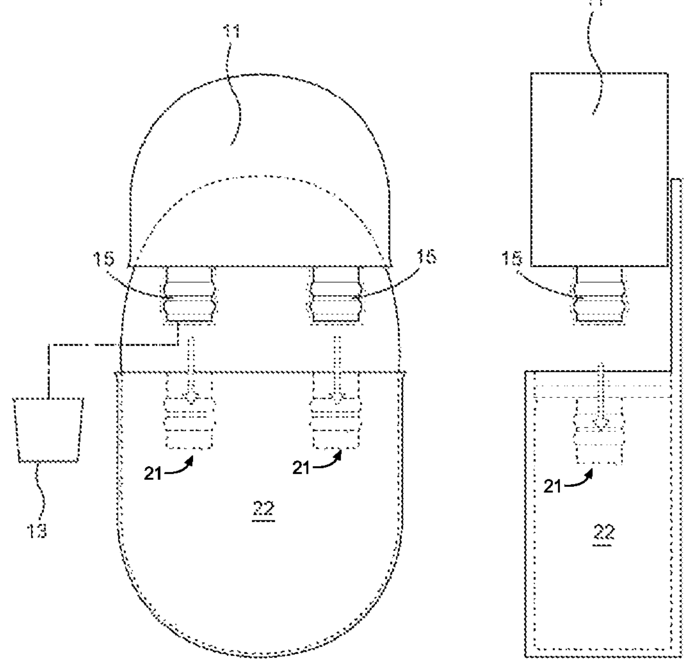
FIG. 25 shows a perspective view of another alternate embodiment of the solution refill cartridge device in use with a repeatedly refillable reusable dispenser showing the coupling mechanism.

Referring now to FIG. 13, there is shown a cross-sectional view of an embodiment of a repeatedly refillable reusable retro-fit dispenser cartridge. One embodiment of a cartridge 1301 for the retro-fit dispensing device includes a housing 1302. The housing is proportioned such that the dimensions of the interior of the housing 1302 are similar to the interior of the housing of the retro-fit dispenser. The housing 1302 has at least one sidewall, a bottom section and an open top section. This will create the interior volume. In one embodiment the housing 1302 is plastic. In another embodiment the housing 1302 is made from polyvinyl alcohol. In yet a further embodiment the housing 1302 is made from a mixture of cellulose and polyvinyl alcohol.

In use a spreadable substance 1202 will be placed into the cartridge 1301. In one embodiment the spreadable substance is in liquid form when it is placed within the cartridge 1301. In one embodiment the cartridge plate 1201 is then pressed into the spreadable substance 1202. The spreadable substance will affix to the cartridge plate 1201. A seal is then placed over the top of the cartridge 1301 to prevent air form entering.

Referring now to FIGS. 11-15 and 16-20, there are shown perspective views of another alternate embodiment of the solution refill cartridge device in use with a repeatedly refillable reusable dispenser. In some embodiments, the solution within the refill cartridge interior volume is configured to mate with those dispensers with a vertical shaft elevator mechanism. This may include a shaft configured to mate with a receiver of those dispensers with a vertical shaft elevator mechanism and shaft receiver.

The solution refill cartridge device includes a housing 11 having a formed side with perimeter sidewalls creating an open end that provides access to an interior volume that receives a solution. The solution conforms to the interior volume and a dispenser. The solution cartridge refill device open side is configured with an enclosure apparatus 13 that seals the solution within the solution cartridge refill device. The enclosure apparatus 13 is removable so to access the solution within the solution refill cartridge device. Removal of the enclosure apparatus 13 allows the formed solution to be dispensed through the open side of the solution refill cartridge device. The solution refill cartridge device aligns and mates to allow the formed solution to be dispensed with, on or in the dispenser, as shown in FIGS. 21-25.

In the shown embodiment, the solution refill cartridge device is configured to operably couple with an internal elevator mechanism of a dispenser, such as a rod 14 for example, allowing incremental usage of the solution of the cartridge when coupled to the dispenser. In the show embodiment, there is further included a moveable plate 15 configured to dislodge the solution from within the cartridge when moved, whereby pressing the moveable plate allows the solution within the solution refill cartridge to be dislodged, aiding the coupling of the solution within the cartridge device coupling apparatus to a coupler of a dispenser.

The solution refill cartridge device is configured to align with the open end of varied materials, shapes and sized dispensers. Further, the device includes a material selected from at least the list of plastic, metals, organic materials, PVOH, Poly Vinyl Succinate, Butene Diol Vinyl Alcohol Co-Polymer, cellulose pulp, or any combination thereof. Additionally, the device is configured to include amounts of solutions with varied pliability aligning with the interior volume of a dispenser.

Referring now to FIGS. 21-25, there are shown multiple views of another alternate embodiment of the solution refill cartridge device in use with a repeatedly refillable reusable dispense. The coupler apparatus 21 may be rotatably coupled to a dispenser 22. The solution within the interior volume of the solution cartridge forms with varying degrees of solidity, when sealed within the enclosed solution refill cartridge device. In some embodiments, the solution is encased in a protective biodegradable membrane or an encasement configured to restrict water vapor transfer, oxygen vapor transfer, humidity and the like to prolong the lifespan of solution. Further, the device may include a protective outer encasement, made of one or more materials selected from at least the list of plastic, metals, organic materials, PVOH, Poly Vinyl Succinate, Butene Diol Vinyl Alcohol Co-Polymer, cellulose pulp, cellophane, nitrous cellophane, cellulose, or a mixture thereof. Any or all of the components of the solution cartridge refill device may be dissolvable in water, compostable, and/or made of virgin or recycled materials.

In the shown embodiment, the solution refill cartridge device is configured to operably couple with a dispenser coupling device 21 which mates to a coupling apparatus 22 within the open side of the solution refill cartridge device.

The solution within the present invention is configured to refill a dispenser so to reuse the dispenser more than once. In some embodiments, the solution refill cartridge device is composed of either one or both of a compostable or water dissolving material so to eliminate single use dispensers of plastic, metal or materials requiring recycling or require long term degradation. Further, in some embodiments, the device includes a sealable opening on the exterior so to inject solution into the cartridge with the enclosure apparatus of the open area affixed, the opening sealed with a secondary material or plug.

In some embodiments, a coupling device 21 embedded within the solution of the open side of the solution cartridge mates to a coupler 22 of a dispenser so to affix a solution from within the solution refill cartridge device to a dispenser. In such embodiments, the coupling to a dispenser of the solution refill cartridge device coupling apparatus is a temporary attachment configured to last the duration of the solution, wherein the coupling is accomplished via at least one of clip on, rotatable coupled on, snap on or other similar means of coupling the cartridge to a dispenser. Further, the open side is configured to temporarily align mating to the open side of a dispenser so to couple solution within the device onto the dispenser.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A solution refill cartridge device configured to be joined to a dispenser, the solution refill cartridge device comprising:

a housing having a formed side with perimeter sidewalls creating an open end that provides access to an interior volume of the housing that receives a solution;

wherein the solution conforms to the interior volume of the housing and to the dispenser;

wherein a solution refill cartridge device open side includes an enclosure apparatus that contains the solution within the solution refill cartridge device;

wherein the enclosure apparatus disconnects so to access the solution within the solution refill cartridge device;

wherein removal of the enclosure apparatus allows the solution to be released through the open side of the solution refill cartridge device;

wherein the solution of the refill cartridge device aligns and mates to allow the solution to be directly dispensed with, on or in the dispenser; and wherein the solution refill cartridge device is removed from the dispenser upon exhaustion of the solution from the solution refill cartridge device in, to, on or with the dispenser further comprising a coupling device embedded within the solution of the open side of the solution refill cartridge device, which mates to a coupler of the dispenser so to affix a solution from within the solution refill cartridge device to the dispenser.

2. The solution refill cartridge device of claim 1, wherein the device is configured to align with an open end of varied materials, shapes, and sized dispensers.

3. The solution refill cartridge device of claim 1, wherein the solution refill cartridge device includes a material selected from the group consisting of plastic, metals, organic materials, PVOH, Poly Vinyl Succinate, Butene Dial Vinyl Alcohol Co-Polymer, cellulose pulp, or any combination thereof.

4. The solution refill cartridge device of claim 1, wherein the solution refill Previously device is configured to-include amounts of solutions with varied pliability, solidity, or viscosity aligning with a volume of the dispenser.

5. The solution refill cartridge device of claim 1, wherein the solution refill cartridge device is configured to operably couple with an internal elevator mechanism of the dispenser, allowing incremental usage of the solution of the solution refill cartridge device when coupled to the dispenser.

6. The solution refill cartridge device of claim 1, wherein the solution refill cartridge device is configured to operably couple with a dispenser coupling device which mates to a coupling apparatus within the open side of the solution refill cartridge device.

7. The solution refill cartridge device of claim 1, wherein a coupling to the dispenser of the solution refill cartridge device coupling apparatus is a temporary attachment configured to last a duration of the solution, wherein the coupling is accomplished via at least one of clip-on, rotatable coupled-on, snap-on or other coupling apparatus for the solution refill cartridge device to the dispenser.

8. The solution refill cartridge device of claim 1, wherein the open side of the solution refill cartridge device is configured to temporarily align mating to an open side of the dispenser so to couple the solution within the solution refill cartridge device onto the dispenser.

9. The solution refill cartridge device of claim 1, further comprising a moveable plate configured to dislodge the solution from within the solution refill cartridge device when moved.

10. The solution refill cartridge device of claim 9, wherein pressing the moveable plate allows the solution within the solution refill cartridge device to be dislodged, aiding the coupling of the solution within the solution refill cartridge device coupling apparatus to a coupler of the dispenser.

11. The solution refill cartridge device of claim 1, wherein the solution is configured to refill the ea dispenser so to reuse the dispenser more than once.

12. The solution refill cartridge device of claim 1, wherein the solution refill cartridge device is composed of either one or both of a compostable material or water dissolving material so to eliminate single use dispensers of plastic, metal or materials requiring recycling or requiring long term degradation.

13. The solution refill cartridge device of claim 1, where in the coupler apparatus rotatably couples to the dispenser.

14. The solution refill cartridge device of claim 1, wherein the solution within the interior volume of the solution refill cartridge device forms with varying degrees of solidity, when sealed within an enclosed solution refill cartridge device.

15. The solution refill cartridge device of claim 1, wherein the solution is encased in a protective biodegradable membrane or an encasement configured to restrict water vapor transfer, oxygen vapor transfer, or humidity to prolong a lifespan of the solution.

16. The solution refill cartridge device of claim 1, further comprising a protective outer encasement made of one or more materials selected from the group consisting of plastic, metals, organic materials, PVOH, Poly Vinyl Succinate, Butene Dial Vinyl Alcohol Co-Polymer, cellulose pulp, cellophane, nitrous cellophane, cellulose, or a mixture thereof.

17. The solution refill cartridge device of claim 1, wherein any component of the solution refill cartridge device is dissolvable in water.

18. The solution refill cartridge device of claim 1, wherein any component of the solution refill cartridge device is compostable.

19. The solution refill cartridge device of claim 1, wherein the solution refill cartridge device includes one or more materials made of virgin or recycled materials.

20. The solution refill cartridge device of claim 1, wherein the solution within the solution refill cartridge device interior volume mates with the dispenser with an elevator mechanism which moves the solution of the solution refill cartridge device through a dispense port of the dispenser.

21. The solution refill device of claim 1, wherein an attachment device is selected from at least the group consisting of a hook, a rotational threaded device, a clip, or a snap.

22. A solution refill cartridge device configured to be joined to a dispenser, the solution refill cartridge device comprising:

a housing having a formed end with varied perimeter sidewalls creating an interior volume that receives varied conforming solutions or materials within;

wherein an open side of the solution refill cartridge device comprises an enclosure apparatus which contains the solution or materials within the solution refill cartridge device; and wherein removal of the enclosure apparatus allows the solution or material to couple with, in, to, or on a dispenser considered nonpermanent, the solution refill cartridge device having a mating and aligning coupler with the dispenser, so to repeatedly refill the dispenser, rendering the dispenser repeatedly reusable, the solution cartridge refill device dissoluble all or in part, upon exhaustion of contents within; and further comprising a coupling device embedded within the solution of the open side of the solution refill cartridge device, which mates to a coupler of the dispenser so to affix a solution from within the solution refill cartridge device to the dispenser.

23. The solution refill cartridge device of claim 22, wherein the enclosure apparatus of the housing is removable by unthreading, peel-off or unhook, so to expose and enable the coupling device of the solution refill cartridge device to couple to the dispenser containing the solution or material with, in, or on the dispenser.

* * * * *